(12) United States Patent
Heatley

(10) Patent No.: US 7,142,895 B2
(45) Date of Patent: Nov. 28, 2006

(54) MOBILE TELEPHONE WITH PAGER MODE

(75) Inventor: David J Heatley, Suffolk (GB)

(73) Assignee: British Telecommunications, London (GB)

( * ) Notice: Subject to any disclaimer, the term of this patent is extended or adjusted under 35 U.S.C. 154(b) by 204 days.

(21) Appl. No.: 10/221,210

(22) PCT Filed: Mar. 28, 2001

(86) PCT No.: PCT/GB01/01383

§ 371 (c)(1),
(2), (4) Date: Sep. 10, 2002

(87) PCT Pub. No.: WO01/76293

PCT Pub. Date: Oct. 11, 2001

(65) Prior Publication Data

US 2003/0040298 A1  Feb. 27, 2003

(30) Foreign Application Priority Data

Mar. 31, 2000  (EP) .................... 00302738

(51) Int. Cl.
*H04B 1/38* (2006.01)
*H04B 1/16* (2006.01)

(52) U.S. Cl. ........... 455/574; 455/343.5; 455/432.2; 455/550.1

(58) Field of Classification Search ........ 455/433, 455/414.1, 414.4, 415, 416, 432.2, 466, 528, 455/456.1, 456.6, 458, 566, 550.1, 574, 573, 455/572, 127.1, 127.5, 343.1, 343.2, 343.5, 455/432.3

See application file for complete search history.

(56) References Cited

U.S. PATENT DOCUMENTS

| 5,278,995 A | * | 1/1994 | Hwang ............... 455/127.5 |
| 5,623,533 A | * | 4/1997 | Kikuchi et al. ......... 455/572 |
| 5,751,760 A | | 5/1998 | Fuller et al. |
| 5,818,920 A | | 10/1998 | Rignell et al. |
| 5,828,949 A | | 10/1998 | Silver et al. |
| 5,870,454 A | | 2/1999 | Dahlen |

(Continued)

FOREIGN PATENT DOCUMENTS

EP  0782359 A  7/1997

*Primary Examiner*—Charles N. Appiah
(74) *Attorney, Agent, or Firm*—Nixon & Vanderhye P.C.

(57) ABSTRACT

A mobile telephone is arranged to detect when its battery voltage has fallen such that only the lowest segment of the four segment battery charge level bar of its LCD display is showing, and, in response, to transmit a "Restricted Delivery Mode" message to a predetermined network destination number, and then to disable its transmit function. An audio signal is generated to alert the user, and a warning message is displayed, e.g., Battery Low, Message Mode, Restricted Delivery Mode" is a selectable option via the telephone's menu. The mobile network, upon receipt of such a "Restricted Delivery Mode" message, sets a "Restricted Delivery Mode" flag in the user's profile. For an originating call the profile is accessed in the normal manner, and, if that flag is set, the network sends, e.g., a "Receive Only—Leave Message" announcement to the caller.

18 Claims, 4 Drawing Sheets

U.S. PATENT DOCUMENTS

| | | | | |
|---|---|---|---|---|
| 5,870,685 A * | 2/1999 | Flynn | ............................ | 455/573 |
| 5,903,845 A * | 5/1999 | Buhrmann et al. | ............ | 455/461 |
| 6,049,713 A * | 4/2000 | Tran et al. | .................... | 455/415 |
| 6,055,305 A * | 4/2000 | Norman et al. | ........... | 379/211.01 |
| 6,185,433 B1 * | 2/2001 | Lele et al. | ..................... | 455/528 |
| 6,275,712 B1 * | 8/2001 | Gray et al. | .................... | 455/522 |
| 6,311,057 B1 * | 10/2001 | Barvesten | ..................... | 455/415 |
| 6,327,478 B1 * | 12/2001 | Baker | ............................. | 455/466 |
| 6,334,054 B1 * | 12/2001 | Link et al. | .................... | 455/413 |
| 6,377,798 B1 * | 4/2002 | Shaffer et al. | ............. | 455/426.1 |
| 6,501,949 B1 * | 12/2002 | Singleton | .................... | 455/422.1 |
| 6,507,735 B1 * | 1/2003 | Baker et al. | ................ | 455/412.1 |
| 6,542,517 B1 * | 4/2003 | Giacalone | ..................... | 370/465 |
| 6,678,515 B1 * | 1/2004 | Gillespie et al. | ........... | 455/412.1 |
| 6,731,957 B1 * | 5/2004 | Shamoto et al. | .............. | 455/574 |
| 6,816,719 B1 * | 11/2004 | Heinonen et al. | ............. | 455/403 |
| 6,832,259 B1 * | 12/2004 | Hymel et al. | ................. | 709/229 |
| 2003/0040298 A1 * | 2/2003 | Heatley | ........................ | 455/411 |
| 2003/0050096 A1 * | 3/2003 | Heatley | ........................ | 455/560 |

* cited by examiner

MOBILE TELEPHONE WITH PAGER MODE

This application is the US national phase of international application PCT/GB01/01383 filed 28 Mar. 2001 which designated the U.S.

BACKGROUND OF THE INVENTION

1. Technical Field

The present invention relates to communications methods and apparatus, and particularly, but not exclusively, to methods of operating mobile communications networks, and to mobile telephones for use with mobile communications networks.

2. Related Art

European Patent Application No. EP 0782359 A2 discloses a mobile terminal having a user-activated pager mode. When the user has selected pager mode, the mobile terminal sends a registration message with a power down indication to de-register itself on the cellular network, and displays "Pager Mode Activated" to indicate that incoming telephone calls will not be responded to. If a call is made to the mobile terminal while it is de-registered, i.e. inactive, the network does not send the call to the mobile terminal but forwards the call to a voice mail service, which sends a voice mail waiting message or a callback number message to the mobile terminal. Since the mobile terminal is currently inactive, the network will not route such messages to the mobile terminal but will wait until such time as the mobile terminal periodically re-registers itself with the network so as to receive any queued SMS or other types of messages from the network.

U.S. Pat. No. 5,828,949 discloses a mobile phone/pager comprising a mobile phone portion and a pager portion. The user can switch the mobile phone portion off, and when he does so the network responds by recording the mobile phone portion as de-registered (inactive). If a call is made while the mobile phone portion is switched off, the network first notes that the mobile phone portion is switched off, and then proceeds to check whether the called mobile phone is recorded as having dual pager/mobile telephone capability, and if so sends a page request to a paging network to page the pager portion. The network may announce to the caller a potential delay in call delivery. Upon receipt of the paging signal, the pager portion activates the mobile phone portion, which sends a registration signal to the network. Upon receipt of the registration signal, the network then routes the incoming call to the mobile phone portion in the normal manner. The mobile phone portion switches itself off when the call is ended.

U.S. Pat. No. 5,818,920 is concerned with preventing calls in a telecommunications network from being connected during specified periods of time, such as when calls to the desired communication terminal have been forwarded to a new communication terminal in a new time zone and the subscriber at the calling communication terminal in unaware of the local time of the new communication terminal. One form of prevention device is disclosed which informs the calling communication terminal of the local time of the new communication terminal prior to connection and requests the calling communication terminal to confirm whether the connection should be made. Another form of the prevention device is disclosed which automatically prevents the connection from being made and informs the calling communication terminal that the connection will not be made.

BRIEF SUMMARY

According to a first aspect of the present invention there is provided a method of operating a communications network having a user profile store, the method comprising the steps of:

retrieving a dialled destination number from signalling data of a call from a calling user to a called user;

accessing the user profile store in accordance with that retrieved dialled destination number to find a corresponding user profile;

ascertaining whether an activity field of a user profile so found contains an indication corresponding to a currently registered network terminal; and if so ascertaining whether a delivery mode field of that user profile contains an indication of receipt from a mobile telephone associated with that user profile of a message requesting update of that mode field to indicate that the mobile telephone, although currently registered is also in a receive-only mode; and if so sending to the calling user an indication that the called user's mobile telephone is currently in said receive-only mode.

This aspect of the present invention is particularly beneficial in mobile telephony and provides an advantage that by virtue of that receive only mode indication, also referred to herein as Restricted Delivery indication or message only indication, e.g. an announcement to the effect that the called user currently wishes to receive only text messages, sent by the mobile network to the caller, the caller is immediately alerted to the situation that the called user's mobile telephone is currently registered with the mobile network, i.e. switched on and capable of receiving, but that either the mobile telephone is in low battery condition, or that for some reason the user has commanded the network to handle his incoming calls in a restricted way in accordance with his chosen delivery mode settings in his user profile.

There may be included the further steps of ascertaining whether a flag in a permitted connections field of the user profile is set, and if not set proceeding with the call;

but if it is set retrieving a calling line identity from the signalling data, ascertaining whether the retrieved calling line identity matches an entry in a permitted connection number field of the called user's user profile, and if there is a matching entry proceeding with the call, else not proceeding with the call.

In this preferred method, the calling user will be connected to the called user and will forewarned to the situation, and similarly the called user, upon receiving a call when in Restricted Delivery mode, will know that no initial explanation of the situation will be necessary.

There may be included the step of responding to receipt of message data from that calling user by sending a text form message to the called user.

When the received message data is in the form of a spoken message, there may be included the step of converting the received message data into text form.

The received message data may be already in text form.

There may be included the steps of ascertaining whether the called user's profile contains at least one other service destination address, and if so sending to the calling user an invitation for the calling user to select one or more of said at least one other service destination address for additional delivery of said text form message.

According to a second aspect of the present invention there is provided a mobile telephone comprising control means arranged to respond to a predetermined condition by changing the operational status of that telephone from a first, normal mode to a second mode, referred to as receive-only mode, by transmitting via a transmit function, to a cellular telephone network with which the telephone is currently registered, a message requesting update of a mode field of a user profile corresponding to that telephone to indicate that the telephone, although currently registered is also in said receive-only mode.

A mobile telephone of this second aspect may be battery powered, have battery voltage sensing means arranged to generate a predetermined output when the battery voltage falls to a predetermined level, and in this case the generation of said predetermined output constitutes said predetermined condition.

The control means may be further arranged to activate, upon completion of that transmission, means for selectively disabling the transmit function.

The control means may be further arranged to override said means for selectively disabling the transmit function for the purpose of allowing transmission of responses to interrogation signals from a communications network.

The control means may be further arranged to provide an audio output upon activation of said means for selectively disabling the transmit function.

According to a third aspect of the present invention there is provided a communications network having a user profile store, and arranged:

to retrieve a dialled destination number from signalling data of a call from a calling user to a called user;

to access the user profile store in accordance with that retrieved dialled destination number to find a corresponding user profile;

to ascertain whether an activity field of a user profile so found contains an indication corresponding to a currently registered network terminal; and if so to ascertain whether a delivery mode field of that user profile contains an indication of receipt from a mobile telephone associated with that user profile of a message requesting update of that mode field to indicate that the mobile telephone, although currently registered is also in a receive-only mode; and if so to send to the calling user an indication that the called user's mobile telephone is currently in receive only mode.

Communications networks in accordance with this third aspect may be arranged to retrieve a calling line identity from the signalling data; to ascertain whether a flag in a permitted connections field of the user profile is set, and if not set, to proceed with the call; but if it is set, to ascertain whether the retrieved calling line identity matches an entry in a permitted connection number field of the called user's user profile, and if there is a matching entry to proceed with the call, else not to proceed with the call.

Preferably, such communications networks are arranged to respond to receipt of message data from that calling user by sending a text form message to the called user.

More preferably, such communications networks are arranged to respond to receipt of said message data in the form of a spoken message, and to convert the spoken message into text form.

Such communications networks may be arranged to ascertain whether the called user's profile contains at least one other service destination address, and if so to send to the calling user an invitation for the calling user to select one or more of said at least one other service destination address for additional delivery of said text form message.

BRIEF DESCRIPTION OF THE DRAWINGS

Specific embodiments of a mobile communications network and of a mobile telephone for use with that network will now be described by way of example with reference to the drawings in which.

DETAILED DESCRIPTION OF EXEMPLARY EMBODIMENTS

Figure 1:
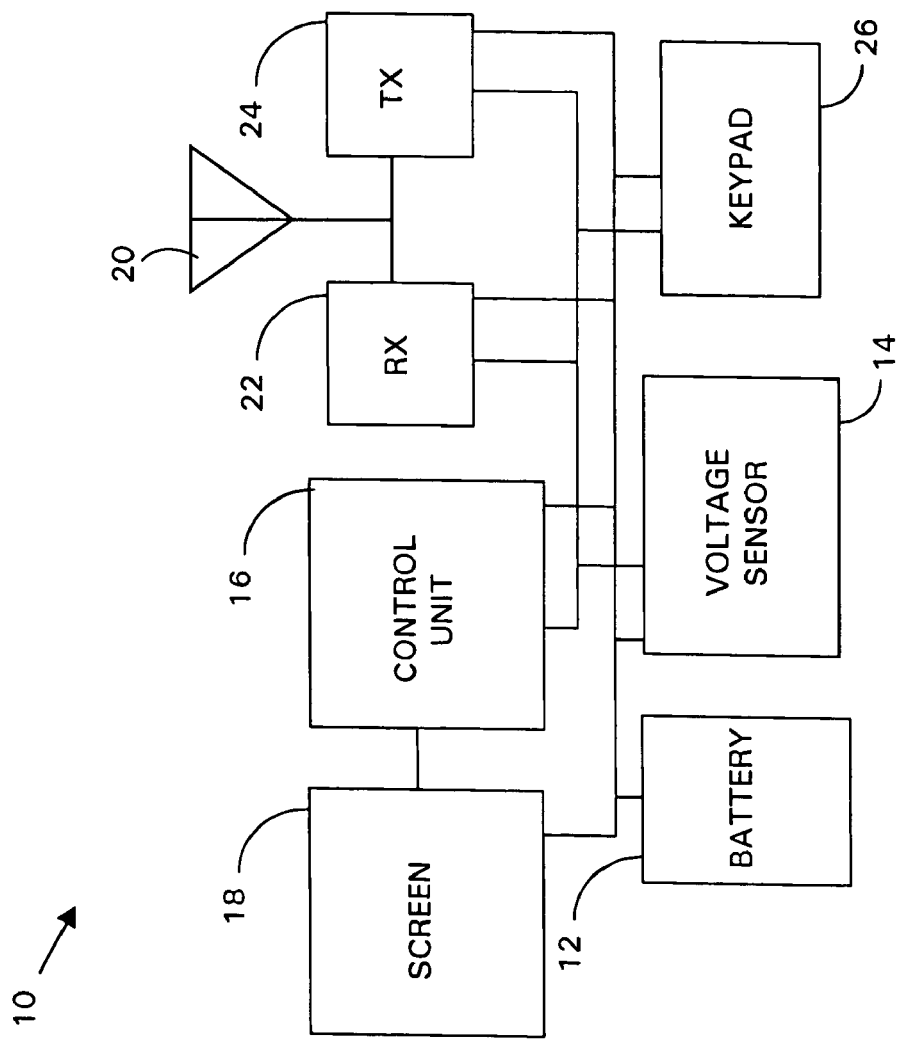
FIG. 1 is a schematic diagram of a mobile telephone arranged to send a "Delivery Mode—Message Only" message to a mobile network.

In this description the following acronyms are used:—
BSS—Base Switching Subsystem
CLI—Calling Line Indication, also known as Calling Line Identity,
FET—Field Effect Transistor
GPRS—General Packet Radio Service
GSM—Global System for Mobile Communications (Groupe Speciale Mobile)
HLR—Home Location Register
IVR—Interactive Voice Response
LCD—Liquid Crystal Display
MSS—Mobile Switching Subsystem
NSS—Network Switching Subsystem
OSS—Network Switching Subsystem
SMS—Short Message System
VLR—Visitor Location Register In FIG. 1 there is shown a mobile telephone 10 having a battery 12, and a battery voltage sensing circuit 14 providing an output signal to a control unit 16 which provides drive signals to an LCD screen 18. Depending upon the output signal of the voltage sensing circuit 14, the control unit 16 commands the display of a four segment battery voltage indicator, commonly known in the art as a battery charge level bar. If the battery is fully charged then all four segments show, and as the battery discharges then the segments are "extinguished", one by one, starting at the fourth (top) segment, until low battery voltage is reached and only the first segment is shown, referred to herein as the mobile telephone being in low battery condition, and finally when the battery voltage becomes too low to power the mobile telephone 10 the first segment is extinguished and he mobile telephone switches itself off.

The mobile telephone 10 also has other components, including an aerial 20, a receive circuit 22 a transmit circuit 24, and a keypad 26.

In addition to controlling the mobile telephone 10 in conventional manner, the control unit 16 of this embodiment is arranged to respond to the "extinction" of the next-to-last segment to transmit a "Delivery Mode—Message Only" message to a Network Switching Subsystem (NSS) 36 of a GSM network 30 (see FIG. 2) to inform it that that the mobile telephone 10 has a low battery condition and that the delivery mode for calls to that mobile telephone 10 is to be changed from Normal to Message Only in the manner described below. The message contains the telephone number of the mobile telephone as its calling number (Calling Line Identity, CLI), and a predetermined telephone number of the GSM network as its called number, and its message content is a unique code representative of the Delivery Mode—Message Only mode. Calls made to that predetermined telephone number are received directly at the NSS 36, and processed by a profile management program forming part of the control programs of the NSS 36.

In a variant, the control unit 16 is also arranged to send the Delivery Mode—Message Only message to the network in response to selection by the user of Message Only mode from a menu system.

The general manner of controlling the functions and operation of a mobile telephone by means of a menu system is well known and will not be described in detail, other than in respect of the particular menu system of the mobile telephone 10 of the present invention, which includes "Message-Mode" as a top level menu function ranking with Phone book, Messages, Call register, etc. When the user selects "Message Mode", the control unit provides displayed text which is either "Current Mode—Message" or "Current Mode—Normal", depending upon whether the last Delivery Mode message sent by the control unit was "Message Only" or "Normal", i.e. whether the mobile telephone is in Message mode or not, and when that text is displayed the Navigator soft key offers "Change".

Suppose that the mobile telephone is in Normal mode, and that the user selects "Change". The control unit sends the "Delivery Mode—Message Only" message to the network, moves to the next level, which provides the options "Some calls", and "No calls", and records that the last Delivery Mode message that it sent was "Message Only", i.e. that the mobile telephone is now in Message mode. On receipt of this message, the NSS 36 ensures that a Delivery Mode flag in a Delivery Mode field 70 in the user's profile 68 is in its set state, e.g. writes a logic "one" to a one bit flag field. The Delivery Mode field 70 is also referred to as the Restricted Delivery Mode field, since if its flag is set, then delivery to the mobile telephone is restricted.

If the user selects "No calls", the control unit sends a "Delivery Mode—No calls" message to the network and jumps to an Alert level providing the options "Custom alert" and "General alert". On receipt of this message, the NSS 36 ensures that a "Permitted Connections" flag in a Permitted Connection field 72-5 in the user's profile 68 is in its reset state.

If the user selects "Some calls", the control unit sends a "Delivery Mode—Some calls" message to the network, and moves down a level to provide the options "Use current profile", "Edit current profile" and "Create custom profile". On receipt of this message, the NSS 36 ensures that the "Permitted Connections" flag in the user's profile 68 is in its set state.

If the user selects "Use current profile", the menu system goes to the Alert level. If the user selects "Create custom profile", the menu system moves to the "Search" level of the Phone book function, ready for the user to find an entry in the Phone book. When an entry has been located, the Navigator soft key offers the function "Select entry", instead of the normal "Call". When the user selects an entry, the control unit sends a "Delivery Mode—Permitted Connection Number" message containing the selected number to the network, and the "Search" level is again offered. If the user has finished selecting entries from the Phone book, he then presses the "C" or Cancel button, and the menu system moves to the Alert level. On receipt of each such message, the NSS 36 checks whether the selected number is already in Permitted Connection Number fields 72-6, etc, in the profile 68 and, if not, writes the selected number to a free field. When a selected number is written to the last free field, the network sends a "Permitted Connection Number Store full" message to the mobile telephone.

If the user selects "Edit current profile", the control unit sends a "Delivery Mode—Edit current profile" message to the network, which responds by sending the numbers stored in the user's "Permitted Connection Number" fields 72-6, etc. By means of further commands, the user has the options to delete any of the displayed numbers, go to the Phone book search function and select an entry as above for creating a custom profile, or key in a telephone number and send it to the network in a "Delivery Mode—Permitted Connection Number" message, as above.

If the user selects "Create custom profile" and the Permitted Connection Number fields 72-6, etc, are full, the network responds in a similar manner to the user selecting "Edit current profile", by sending the numbers stored in the user's Permitted Connection Number fields 72-6, etc, and the user can now edit the stored numbers.

When at the Alert level, if the user selects "General alert", then the menu system moves out of the Message mode function and returns to the its root level in which the Navigator soft key offers the function "Menu". If the user selects "Custom alert", the menu system provides the options "Discreet", "Vibration" and the like, and including "Tones". This last option enables the user to select a different incoming call alert or a different incoming SMS message alert from that selected for use when the mobile telephone is not in Message mode, or in other words when the Restricted Delivery Mode flag of the user's profile in the network is in its reset state.

Figure 2:
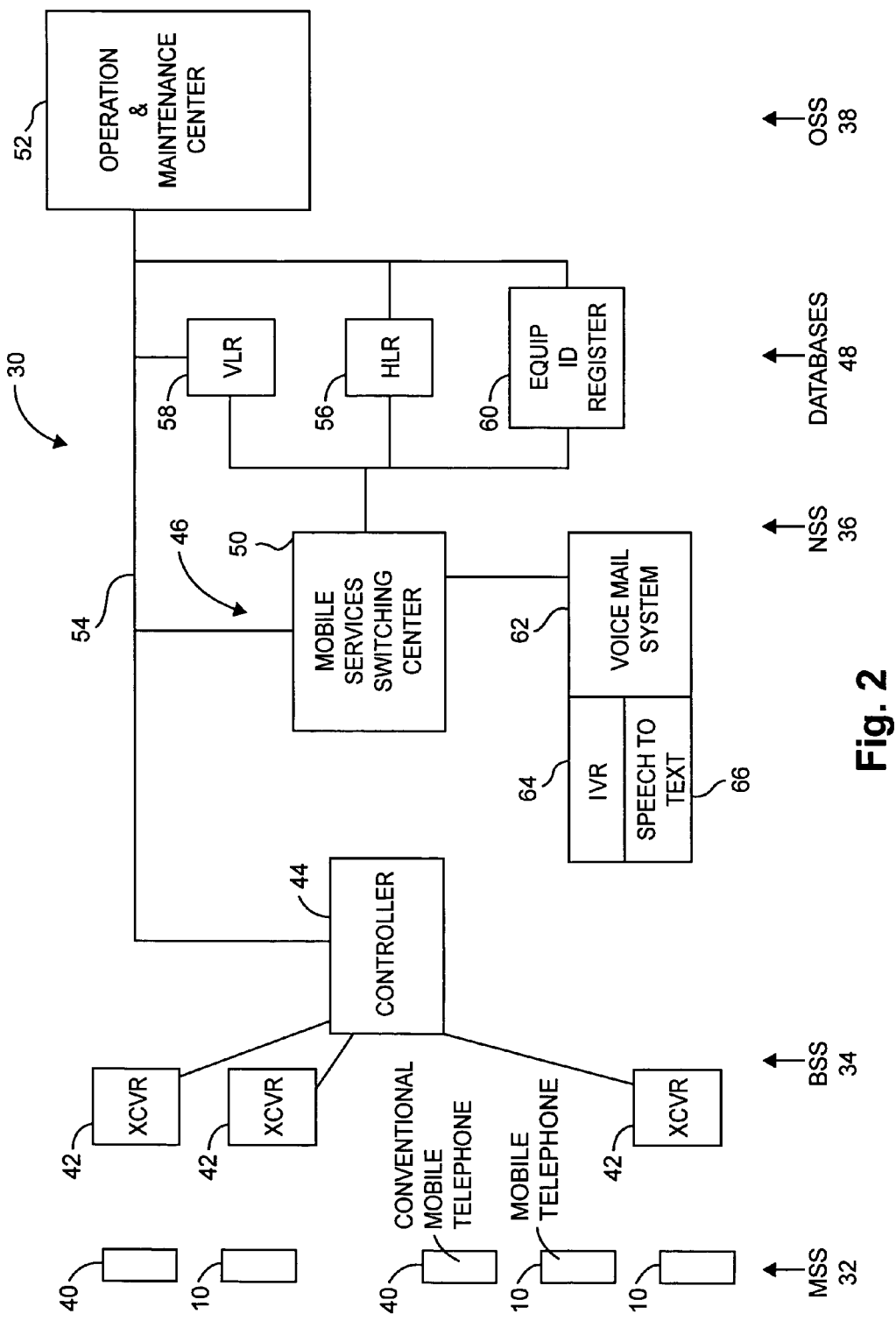
FIG. 2 is a schematic diagram of a mobile communications network arranged to play a warning announcement to a caller if a delivery mode flag in a user profile for the called user is set.

In FIG. 2, there is shown a GSM network 30 constituted by four subsystems, namely, Mobile Station Subsystem (MSS) 32, Base Station Subsystem (BSS) 34, Network Switching Subsystem (NSS) 36 and Operation Subsystem (OSS) 38. Global communications is achieved by interconnection of spaced apart national-based GSM networks operated by different respective network operators.

The GSM system is well known to the skilled person in the art and is described below only in high-level detail. However, should any reader require more information, he will find a number of publications on GSM; particularly, "The GSM System for Mobile Communications" by M. Mouly and M.-B. Pautet, ISBN 2-950719-0-7, published 1992 by the authors thereof.

The MSS 32 comprises a plurality of the mobile telephones 10, and, until 100% penetration of the mobile telephone market by mobile telephones 10, there will be a plurality of conventional mobile telephones 40.

The BSS 34 comprises a plurality of base transceiver stations 42 and a plurality of base station controllers 44, only one which is shown. Each of the base station controllers 44 is connected to the NSS 36 and to a plurality of the base transceiver stations 42.

The NSS 36 comprises an exchange system 46 and user and terminal equipment databases 48. The exchange system 46 comprises a plurality of interconnected mobile services switching centres 50, only one which is shown, which are connected to the user and terminal equipment databases 48.

The OSS 38 comprises an operation and maintenance centre 52 which is connected, via a data network 54, to the BSS 34 and the NSS 36, and is arranged to manage the user and terminal equipment databases 48.

The user and terminal equipment databases 48 comprise a home location register (HLR) 56, a visitor location register (VLR) 58 and an equipment identity register 60.

A Voicemail system 62 is connected to the exchange system 46 and includes an interactive voice response facility (IVR) 64 capable of generating selected announcements, and a speech to text converter 66.

The HLR 56 is a database which stores user profiles 68 (see FIG. 3), which contain user-specific information relevant to the provision of telecommunications services and identifying whether a given teleservice or bearer service can be provided for a user, and also user preferences.

The VLR 58 temporarily stores subscription data for users who are normally registered with a different home GSM network and who are currently registered with the GSM network 30, i.e. under a roaming arrangement.

Figure 3:
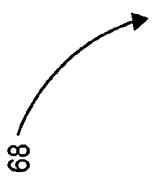
FIG. 3 is a schematic diagram of some of the fields of a user profile used in the network of FIG. 2.

FIG. 3 shows a user profile 68 comprising, inter alia, a Delivery Mode field 70 containing a flag which, when set, is indicative of the network delivery mode for calls to that called user currently being, prima facie, "Message Only" mode, i.e. that either the mobile telephone is in low battery condition or the user has selected Message Only mode, e.g. from the menu. The user profile 68 also comprises a number of fields 72-1, 72-2, etc for enabling the user to specify in detail how the network is to handle incoming calls when the Delivery Mode flag is set. For those users who do not yet use a mobile telephone 10, their Delivery Mode flags will be permanently in their reset state. In variants, the user profiles are of two types, namely the user profile 68 which has a Delivery Mode field 70, and a user profile (not shown) which does not have such a Delivery Mode field 70 and associated fields 72.

If the flag in the Delivery Mode field 70 is set, the NSS 36 first checks the contents of the fields 72-1 etc.

If a flag in a Send Short Message System (SMS) Message field 72-1 is set, then the user has elected for the network to invite the caller to send a message to the called user, in the manner described below.

If a flag in a Divert to Voicemail field 72-2 is set, then the user has elected to have calls diverted to the Voicemail system 62.

If there is an e-mail address in a Send E-mail field 72-3, then the user has elected to have the caller's message sent to him in an e-mail message.

If there is an telephone number in a Send Fax field 72-4, then the user has elected to have the caller's message sent to him in a fax message.

The e-mail address in the Send E-mail field 72-3, and the fax address in the Send Fax field 72-4 constitute other service destination addresses of the present invention.

If a flag is set in a Permitted Connection field 72-5, then the user has elected to have a call whose CLI matches a "Permitted" telephone number contained in one of Permitted Connection Number fields 72-6, etc. delivered to his mobile telephone 10. The user might choose to have calls from a spouse or a child always delivered, even though his mobile telephone is in low battery condition, and the Delivery Mode flag is set. The user may leave the numbers entered in the Permitted Connection Number fields 72-6, etc, unchanged on a medium to long term basis, but can select when to have the network deliver Permitted calls by setting or resetting the Permitted Connection flag.

In variants, the Send E-mail field 72-3 and the Send Fax field 72-4 each comprises a respective pair of subfields, one of the pair stores the respective address or number, and the other stores a flag which indicates whether the user has elected that delivery method.

The user can control the contents of the fields 70 and 72, i.e. change the state of flags, enter addresses and numbers, and change or delete them, by sending appropriate control messages from his mobile telephone to the NSS 36, via the above mentioned predetermined telephone number.

The NSS 36 is arranged to respond to an incoming call having the above mentioned predetermined destination address, i.e. a "Delivery Mode—Message Only" message, by retrieving the message content of that incoming call. Upon recognising the retrieved message as the above mentioned unique code representative of the Delivery Mode—Message Only mode, the NSS 36 accesses the user profiles in accordance with a source telephone number retrieved from the incoming call, finds the corresponding user profile and changes the flag in its Delivery Mode field 70 from its reset state to its set state. If the Delivery Mode flag is in its reset state, then delivery of calls to the user is not restricted, but if the Delivery Mode flag is set, this constitutes a Restricted Delivery mode of the present invention.

Additionally, the NSS 36 generates a short call to the user's mobile telephone 10. Thus, the user's mobile telephone 10 gives a call alert signal for a few seconds, which serves as an audio warning signal. The network also sends an SMS message containing the text "Message Only", or in a variant "Receive Only". In a variant, the network does not send that SMS message but, instead, a text message, e.g. "Battery Low, Message Only", is stored in a memory location in the mobile telephone 10 and the control unit 16 responds to the receipt of that brief call, i.e. the first received call after sending the "Delivery Mode—Message Only" message, to retrieve this text, and to display it. In another variant, the network does not generate the short call but, instead, the control unit 16 is also arranged to generate a tone alert for the user at the same time as it sends the "Delivery Mode—Message Only" message to the network. This tone alert might be a specific tune not used or selected for call alerting, or a combination of beeps.

The NSS 36 is arranged to respond to an originating call from a caller, also referred to herein as a calling user, using a mobile telephone 10 or 40, to operate in accordance with the previous mentioned well known GSM system sequence, modified in accordance with the present invention. Thus, the NSS 36 accesses the user profile 68 associated with the called number to ascertain whether the called mobile telephone is active, and provided that it is, then the NSS 36 proceeds to ascertain the state of the flag in the Delivery Mode field 70.

If the flag in the Delivery Mode field 70 is set, and the flag in the Permitted Connection field 72-5 is set, the NSS 36 first checks the contents of the Permitted Connection Number fields 72-6, etc, to see whether that originating call is to be delivered to the called user, even though the Delivery Mode flag is set, i.e. by checking whether the CLI of that originating call matches the content of one of the Permitted Connection Number fields 72-6, etc.

If the caller's CLI matches a number in one of the Permitted Connection Number fields 72-6, etc, the NSS 36 responds to that originating call from that caller by sending an appropriate announcement selection signal to the Voicemail system 62 for generating by the IVR 64 the selected announcement, "Your call is being connected. Please note that the number you have called is in Message Mode.", or some other suitable announcement. In this way, the caller knows that the battery of the called telephone might well be in a low charge state and he can thus avoid unnecessary conversation. Similarly, the called user will know from the fact that he has received a voice call whilst his Delivery Mode flag is set that the caller has been made aware that his telephone battery might be in a low charge state, and, again, unnecessary conversation can be avoided because the called user does have to waste time warning the caller about that condition.

If, however, the caller's CLI does not match a number in one of the Permitted Connection Number fields 72-6, etc, the NSS 36 proceeds to check the fields 72-1 to 72-4. Assuming that the called user has left the fields 72-3 and 72-4 containing null data, has not set the flag in the Divert to Voicemail field 72-2, and has set the flag in the Send SMS Message field 72-1, the NSS 36 responds to that originating call by sending an appropriate announcement selection signal to the Voicemail system 62 for generating by the IVR 64 the selected announcement, "The number you have called is in Message Mode. You may speak a short message or key a text message, and it will be delivered by SMS.". Other suitable messages can be used, for example, "The number you have called is not accepting calls. You may speak a short message or key a text message, and it will be delivered by SMS.", and instead of using the term Message Mode in the announcement, any other equivalent expression could be used. These announcements played to the caller constitute an indication that the called user is currently in restricted delivery mode, and are indicative that the called user can receive a text form message.

The default condition is that NSS 36 sets the flag in the Send SMS Message field 72-1 at the same time as it sets the flag in the Delivery Mode field 70, although in variants, the flag in the Send SMS Message field 72-1 remains in its reset state when the NSS 36 sets the flag in the Delivery Mode field 70.

If two or more delivery modes are possible for a call, e.g. both SMS message and Voicemail, the NSS 36 sends an appropriate announcement selection signal to the Voicemail system 62 for generating by the IVR 64 a corresponding announcement, in this case, "For delivery by SMS, key or speak one. For delivery by Voicemail, key or speak two.". This will vary in dependence upon which delivery modes are available, for example one announcement might be "For delivery by SMS, key or speak one. For delivery by Fax, key or speak two", and another announcement might be "For delivery by SMS, key or speak one. For delivery by Voicemail, key or speak two. For delivery by E-mail, key or speak three. For delivery by Fax, key or speak four".

If the caller is offered, or has selected, SMS delivery, and speaks a message, this is received by the IVR 64 and passed to the speech to text converter 66 to be converted into the appropriate format to be sent to the called number as an SMS message. Alternatively, the caller may enter his mobile telephone's menu, and select the Write Message function from the Message Function, and use his keypad to create a text message. When he has finished creating the text message, he sends the message by selecting Options, and then Send.

The NSS 36 receives either the text message output from the speech to text converter 66, or the text message sent by the caller, and generates an SMS message and sends that to the called number.

The control unit 16 is arranged to respond to the battery being recharged to a higher state of charge, for example at least three segments showing on the display, to send to the network at the above mentioned predetermined destination address a "Delivery Mode—Normal" message. The NSS 36 responds to receipt of this message by resetting the flag in the Delivery Mode field 70. The "Delivery Mode—Normal" message can also be sent in response to selection by the user of Delivery Mode—Normal option from the menu.

Figure 4:
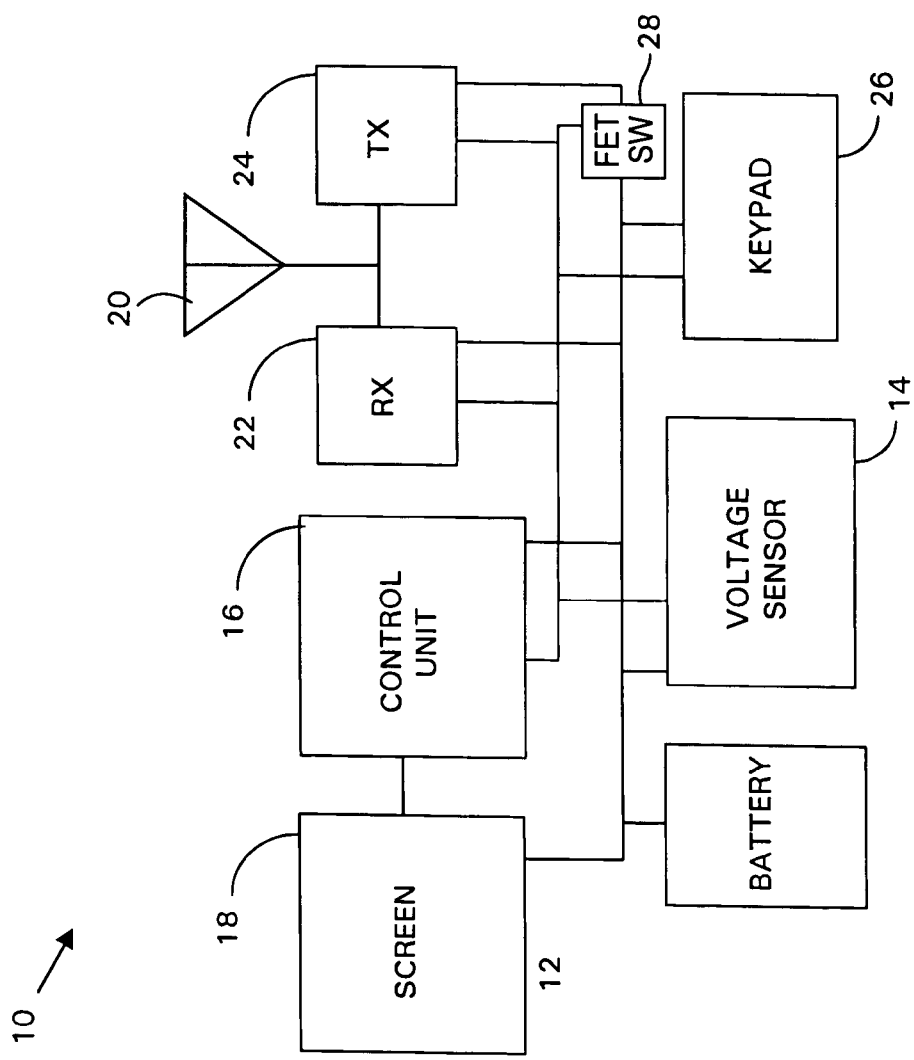
FIG. 4 is a schematic diagram of an alternative embodiment of the mobile telephone of FIG. 1.

In an alternative embodiment shown in FIG. 4, a FET switch 28 is disposed in series with the battery power line to the transmit circuit 24, and the gate of a FET switch 28 is connected to the control unit 16.

In this alternative embodiment, after the control unit 16 has transmitted the "Delivery Mode—Message Only" message, it disables the transmit circuit 24 by means of a control signal applied to the gate of the FET switch 28. In order that the standard response messages which the mobile telephone 10 generates and transmits in response to receipt of standard GSM interrogation signals from the network can still be transmitted, even though the transmit circuit 24 has been disabled, the control unit 16 is arranged to respond to receipt of each standard GSM interrogation signal by providing an override signal which disables the effect of the control signal applied to the gate of the FET switch, and thus allows the mobile telephone 10 to send a respective standard response message, thus enabling the network to continue to be able to determine the location of the mobile telephone in the usual manner.

This alternative embodiment is particularly beneficial in mobile telephony and provides an advantage that a caller is immediately alerted to the situation that the called user's mobile telephone might have been switched from full duplex operation, i.e. both receive and transmit functionality, to simplex functionality, i.e. receive mode only, thus enabling a calling user to be confident that in the event of receipt of such a network announcement the called user's mobile was not switched off, either by intention or due to low battery charge, and the called user would be able to receive messages. If the called user's mobile had switched itself off because of low battery voltage, the called user would be completely ignorant of any incoming messages, voice or text, until he had replaced or recharged the battery, and then entered the Read Messages or Missed Calls functions of the menu, or had accessed a Voicemail service to check whether any messages had been left. Furthermore, the calling user would receive a standard announcement to the effect that the call could not be connected, and this could lead to frustration that the calling user could not get a message to the called user. In the case where the called user had set Divert to Voicemail in the event that an incoming call could not be connected, the calling user will still not know when, and if, the called user will next retrieve messages from the Voicemail service.

Whereas in the above described embodiment the network 30 is a GSM network, it will be appreciated that this is not a limiting factor of the present invention and that the network 30 could equally well be a General Packet Radio Service (GPRS) network.

Whereas in the above described embodiment the control messages from the mobile telephone sent to the above mentioned predetermined telephone number are received directly by the NSS 36 and handled by the profile management program forming part of the control programs of the NSS 36, this profile management program managing the fields of the user's profile, e.g. changing the state of flags, entering addresses and numbers, and changing or deleting them, in a variant the control messages are received at the operation and maintenance centre 52, and the management of the profile in the NSS 36 is performed remotely by control programs in the operation and maintenance centre 52, or manually by network operations personnel at the operation and maintenance centre 52 if the user communicates his intentions for profile change otherwise than by the control messages sent from his mobile telephone.

Whereas in the above mentioned variant, the NSS 36 retrieves a stored menu function identifier from a field 82 associated with SMS messages, and sends a menu function command signal in association with the SMS message, in a further variant the menu function command signal is incorporated within a modified alert command message transmitted to the called user's mobile telephone to trigger its internal ringer. In this case, the mobile telephone simultaneously rings and auto-configures in accordance with the menu function command, ready for the called user to respond. The modified alert command message might include other additional information for use by the called user's mobile telephone for control of its operation or for display.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Any discussion of the prior art throughout the specification should in no way be considered as an admission that such prior art is widely known or forms part of common general knowledge in the field.

What is claimed is:

1. A method of operating a communications network having a user profile store arranged to store information relating to the operational status of a user's mobile telephone, said method comprising:
   retrieving a dialed destination number from signalling data of a call from a calling user to a called user;
   accessing the user profile store in accordance with that retrieved dialed destination number to find a corresponding user profile;
   ascertaining whether an activity field of a user profile so found contains an indication corresponding to a currently registered network terminal; and if so
   ascertaining whether a delivery mode field of that user profile contains a predetermined operational status indicated by receipt from a mobile telephone associated with that user profile of a message requesting update of that mode field to indicate that the mobile telephone, although currently registered is also in a receive-only mode, such a message being indicative of a low battery condition of the mobile telephone having been sensed; and if so
   sending to the calling user an indication that the called user's mobile telephone is currently in said receive-only mode.

2. A method as in claim 1, including the further steps of:
   ascertaining whether a flag in a permitted connections field of the user profile is set, and if not set
   proceeding with the call;
   but if it is set
   retrieving a calling line identity from the signalling data, ascertaining whether the retrieved calling line identity matches an entry in a permitted connection number field of the called user's user profile, and if there is a matching entry proceeding with the call, else not proceeding with the call.

3. A method as in claim 1, including the further steps of:
   not proceeding with the call;
   ascertaining whether the user profile contains an indication that the called user's mobile telephone can receive a text form message; and if so
   responding to receipt of message data from that calling user by sending a text form message to the called user's mobile telephone.

4. A method as in claim 3, wherein, if the user profile contains an indication that the called user's mobile telephone can receive a text form message, the sending step includes sending an indication that the called user's mobile telephone can receive a text form message.

5. A method as in claim 3, wherein the received message data is in the form of a spoken message, and including the step of converting the received message data into text form.

6. A method as in claim 3, wherein the received message data is already in text form.

7. A method as in claim 3, including the step of ascertaining whether the called user's profile contains at least one other service destination address, and if so sending to the calling user an invitation for the calling user to select one or more of said at least one other service destination address for additional delivery of said text form message.

8. A method for controlling a battery powered mobile telephone, said method comprising:
   responding to a predetermined condition of sensed battery voltage falling to a predetermined level by changing the operational status of that telephone from a first, normal mode to a second mode, referred to as receive-only mode, by transmitting via a transmit function, to a cellular telephone network with which the telephone is currently registered, a message requesting update of a mode field of a user profile corresponding to that telephone to indicate that the telephone, although currently registered is also in said receive-only mode such a message being indicative of a low battery condition of the mobile telephone having been sensed.

9. A method as in claim 8, wherein upon completion of that transmission, means is activated for selectively disabling the transmit function.

10. A method as in claim 9, wherein said means for selectively disabling the transmit function is overridden for the purpose of allowing transmission of responses to interrogation signals from a communications network.

11. A communications network having a user profile store arranged to store information relating to the operational status of a user's mobile telephone, and arranged:
    to retrieve a dialed destination number from signalling data of a call from a calling user to a called user;
    to access the user profile store in accordance with that retrieved dialed destination number to find a corresponding user profile;
    ascertain whether an activity field of a user profile so found contains an indication corresponding to a currently registered network terminal; and if so
    to ascertain whether a delivery mode field of that user profile contains a predetermined operational status indicated by receipt from a mobile telephone associated with that user profile of a message requesting update of that mode field to indicate that the mobile telephone, although currently registered is also in a receive-only mode, such a message being indicative of a low battery condition of the mobile telephone having been sensed; and if so
    to send to the calling user an indication that the called user's mobile telephone is currently in receive only mode.

12. A communications network as in claim 11, and arranged to retrieve a calling line identity from the signalling data;
    to ascertain whether a flag in a permitted connections field of the user profile is set, and if not set, to proceed with the call;

but if it is set, to ascertain whether the retrieved calling line identity matches an entry in a permitted connection number field of the called user's profile, and if there is a matching entry to proceed with the call, else not to proceed with the call.

13. A communications network as in claim 12, and arranged to respond to receipt of message data from that calling user by sending a text form message the called user's mobile telephone.

14. A communications network as in claim 13, and arranged to respond to receipt of said message data in the form of a spoken message, and to convert the spoken message into text form.

15. A communications network as in claim 13, and arranged to ascertain whether the called user's profile contains at least one other service destination address, and if so to send to the calling user an invitation for the calling user to select one or more of said at least one other service destination address for additional delivery of said text form message.

16. A battery powered mobile telephone, comprising:
control means arranged to change the operational status of that telephone from a first, normal mode to a second mode, referred to as receive-only mode, by transmitting via a transmit function, to a cellular telephone network with which the telephone is currently registered, a message requesting update of a mode field of a user profile corresponding to that telephone to indicate that the telephone, although currently registered is also in said receive-only mode;

wherein the control means is arranged to transmit said message requesting update of said mode field in response to said predetermined output thereby changing the operational status of the telephone; and battery voltage sensing means arranged to generate a predetermined output when the battery voltage falls to a predetermined level;

wherein said control means is arranged to change the operational status of the telephone in response to said predetermined output.

17. A telephone as in claim 16 wherein said control means is further arranged to activate, upon completion of that transmission, means for selectively disabling the transmit function.

18. A telephone as in claim 17 wherein said control means is further arranged to override said means for selectively disabling the transmit function for the purpose of allowing transmission of responses to interrogation signal from a communications network.

* * * * *